(12) United States Patent
Chen et al.

(10) Patent No.: US 8,272,273 B2
(45) Date of Patent: Sep. 25, 2012

(54) STRAIN MEASUREMENT DEVICE AND METHOD OF STRAIN MEASUREMENT USING THE SAME

(75) Inventors: Lu-Zhuo Chen, Beijing (CN);
Chang-Hong Liu, Beijing (CN);
Jia-Ping Wang, Beijing (CN);
Shou-Shan Fan, Beijing (CN)

(73) Assignees: Tsinghua University, Beijing (CN);
Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 291 days.

(21) Appl. No.: 12/850,628

(22) Filed: Aug. 5, 2010

(65) Prior Publication Data
US 2011/0137577 A1 Jun. 9, 2011

(30) Foreign Application Priority Data
Dec. 4, 2009 (CN) .......................... 2009 1 0188746

(51) Int. Cl.
*G01B 7/16* (2006.01)
(52) U.S. Cl. .......................................... 73/777; 73/760
(58) Field of Classification Search ............... 73/760, 73/777, 862.627
See application file for complete search history.

(56) References Cited

U.S. PATENT DOCUMENTS

| | | | |
|---|---|---|---|
| 6,848,320 B2* | 2/2005 | Miyajima et al. | 73/763 |
| 7,336,523 B2* | 2/2008 | Kang | 365/151 |
| 7,559,253 B2* | 7/2009 | Liu et al. | 73/827 |
| 7,644,622 B2* | 1/2010 | Qiao et al. | 73/723 |
| 7,915,598 B2* | 3/2011 | Jiang et al. | 250/472.1 |
| 7,933,058 B2* | 4/2011 | Liu et al. | 359/288 |
| 7,947,145 B2* | 5/2011 | Wang et al. | 156/281 |

* cited by examiner

*Primary Examiner* — Max Noori
(74) *Attorney, Agent, or Firm* — Altis Law Group, Inc.

(57) ABSTRACT

A strain measurement device includes a strain gauge, a holding device, a transverse strain recorder, and a data processing device. The strain gauge includes at least one first and at least one second layers of carbon nanotube films, each layer of carbon nanotube films having a plurality of carbon nanotubes. The carbon nanotubes in at least one first layer of carbon nanotube film align along a first direction. The carbon nanotubes in at least one second layer of carbon nanotube film align along a second direction. The holding device is used to fasten a specimen and the strain gauge. The transverse strain recorder is used to record a transverse strain of the strain gauge. The data processing device is used to calculate an axial strain of the strain gauge.

20 Claims, 9 Drawing Sheets

STRAIN MEASUREMENT DEVICE AND METHOD OF STRAIN MEASUREMENT USING THE SAME

This application claims all benefits accruing under 35 U.S.C. §119 from China Patent Application No. 200910188746.9, filed on Dec. 4, 2009 in the China Intellectual Property Office, incorporated herein by reference.

BACKGROUND

1. Technical Field

The present disclosure relates to strain measurement devices and methods for measuring strain and, particularly, to a strain measurement device based on carbon nanotubes and a method for measuring strain using the same.

2. Description of Related Art

Strain is an amount of deformation of a body due to an applied force. More specifically, strain ($\epsilon$) is defined as the fractional change in length, and can be positive (tensile) or negative (compressive). In practice, the magnitude of measured strain is very small.

While there are several methods of measuring strain the most common is with a strain gage, a device whose electrical resistance varies in proportion to the amount of strain in the device. The most widely used gage is a bonded metallic strain gage.

The metallic strain gage consists of a very fine wire or, more commonly, metallic foil arranged in a grid pattern. The grid pattern maximizes the amount of metallic wire or foil subject to strain in the parallel direction. The cross-sectional area of the grid is minimized to reduce the effect of shear strain and Poisson Strain. The grid is bonded to a thin backing, called the carrier, which is attached directly to the test specimen. Therefore, the strain experienced by the test specimen is transferred directly to the strain gage, which responds with a linear change in electrical resistance. In application, a voltage is applied on the strain gage, and a circuit system is used to measure the change of electrical resistance, and output the strain.

However, the electrical resistance change of the metallic strain gage is not sensitive to the small strain; therefore, it can not measure the small strain of the specimen when a force is applied on it.

What is needed, therefore, is to provide a strain measurement device can measure the small strain, and a method using the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
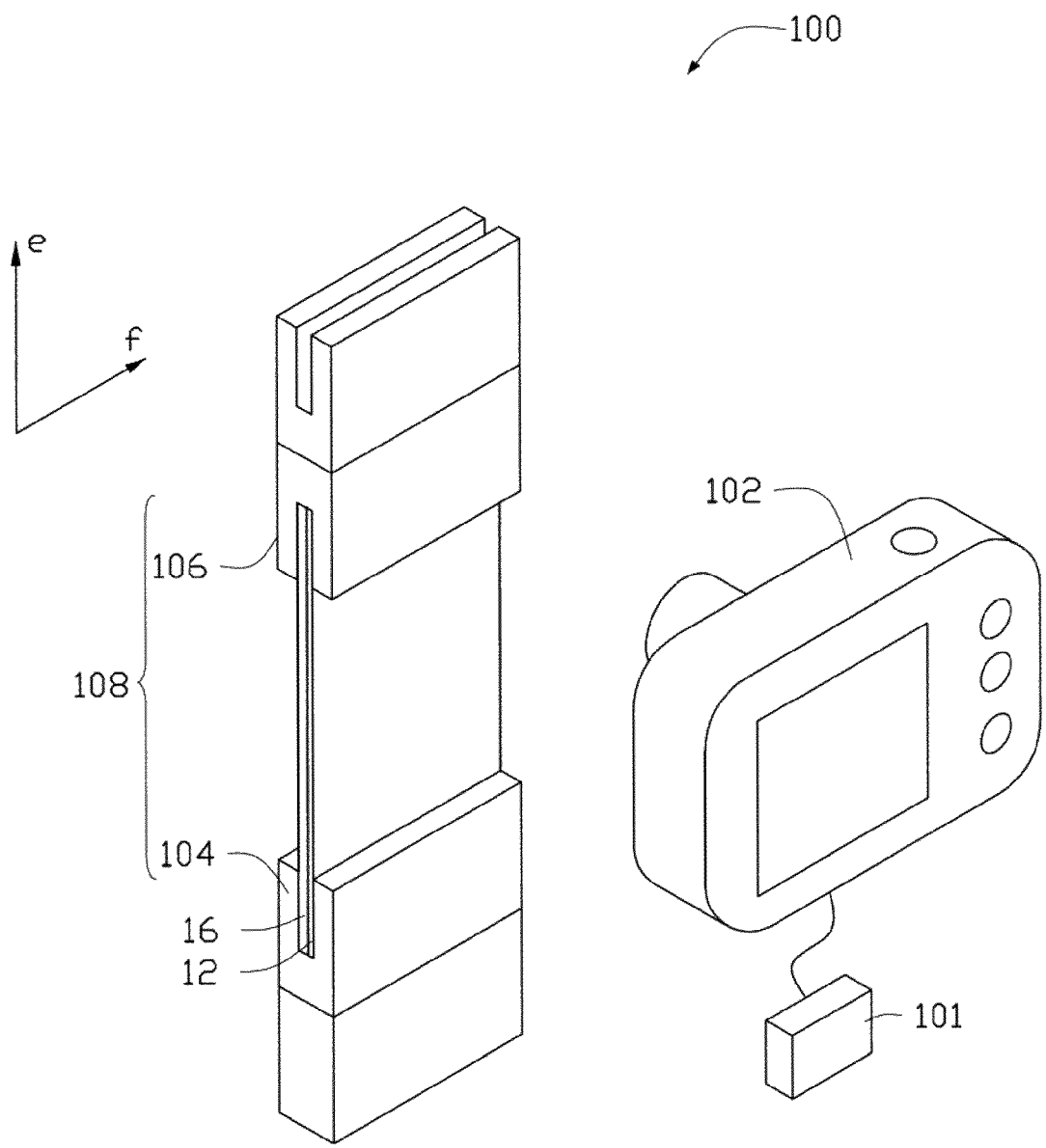
FIG. 1 is a schematic view of an embodiment of a strain measurement device.

Referring to FIG. 1, one embodiment of a strain measurement device 100 includes a transverse strain recorder 102, a holding device 108, a strain gauge 12 and a data processing device 101. In application, the strain gauge 12 is positioned on a surface of a specimen 16. The data processing device 101 can be electrically connected with the transverse strain recorder 102 via data wires, such that data can be transmitted from the transverse strain recorder 102 to the data processing device 101.

The holding device 108 can hold the strain gauge 12 and the specimen 16. The holding device 108 includes a first clip 104 and a second clip 106. The first clip 104 and the second clip 106 can be relatively moveable. The specimen 16 with the strain gauge 12 bonded on its surface is fastened between the first clip 104 and the second clip 106, when the strain measurement device 100 is in operation. The first clip 104 and the second clip 106 can be made of metal, ceramic, or plastic.

The transverse strain recorder 102 can record the transverse strain of the strain gauge 12. Because the first clip 104 and the second clip 106 can be relatively moveable, when a force is applied on the strain gauge 12 along an axial of the strain gauge 12 via the first clip 104 and the second clip 106 in application, the strain gauge 12 would extend or contract in the transverse direction. The transverse strain recorder 102 can be located a distance from the strain gauge 12 in operation, as long as the transverse strain recorder 102 can record the deformation of the strain gauge 12 in the transverse direction, such as to record the transverse strain of the strain gauge 12. The transverse strain recorder 102 can be an image recording device, such as digital camera, camcorder, or video camera. In one embodiment, the transverse strain recorder 102 is a digital camera.

The data processing device 101 described above can calculate an axial strain of the strain gage 12. The data processing device 101 can be a computing device, such as small computer, personal computer, notebook, server, or supercomputer. In one embodiment, the data processing device 101 is a small computer.

Figure 2:
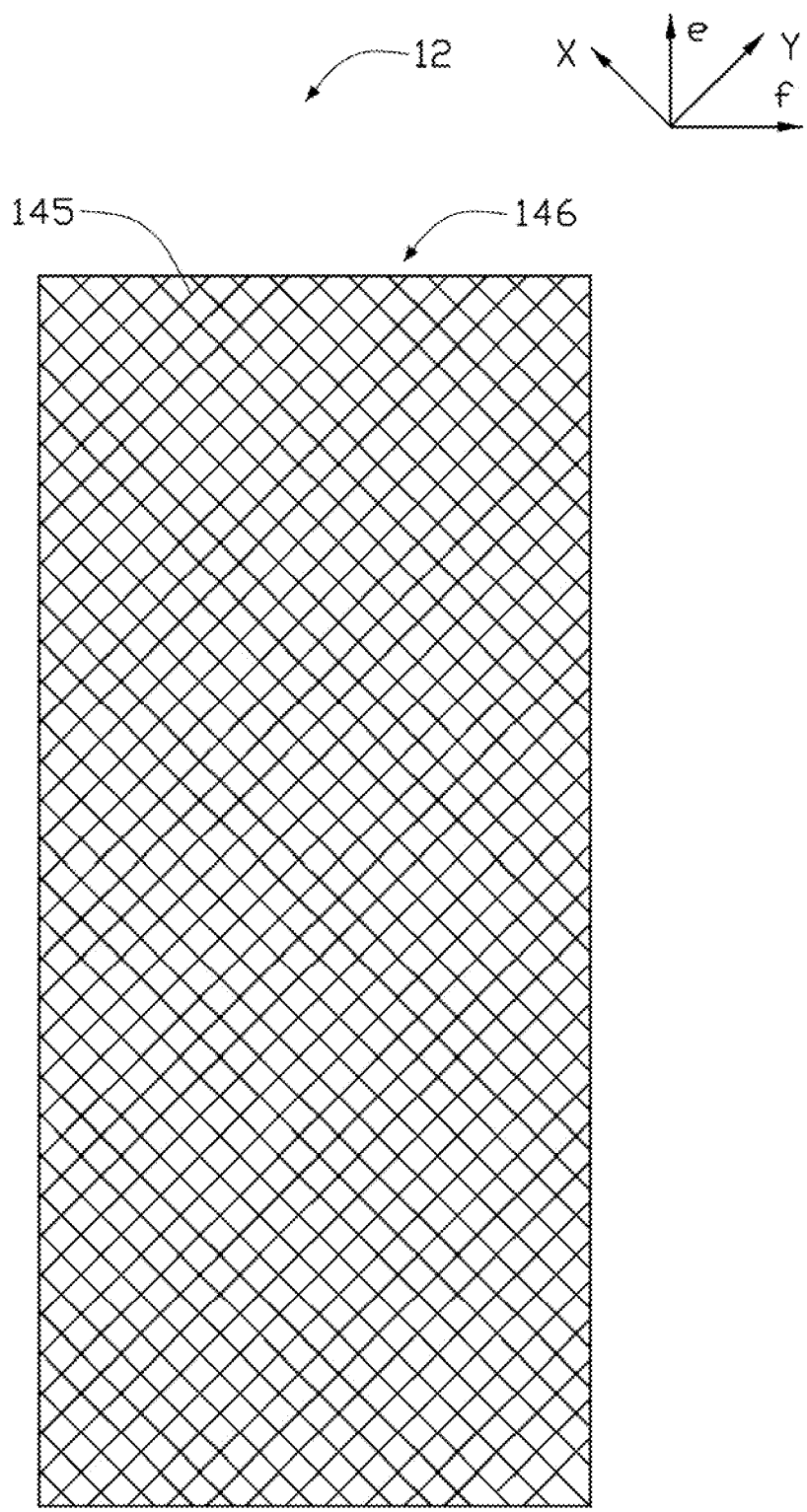
FIG. 2 is a schematic view of a strain gauge with a carbon nanotube film structure used in the strain measurement device of FIG. 1.

The strain gauge 12 can be a sheet material, and can be cut according to the shape of the specimen 16. The strain gauge 12 has a positive Poisson's Ratio. Referring to FIG. 2, one embodiment of the strain gauge 12 is a carbon nanotube film structure 146 having a rectangular shape the same as that of the specimen 16. The carbon nanotube film structure 146 includes a plurality of carbon nanotubes 145 adhered together by Van der Waals attractive forces. The orientation of the carbon nanotubes 145 is biaxial which means the carbon nanotubes 145 can be divided into two parts according to their orientation. A first part of the carbon nanotubes 145 is aligned along a first direction X or namely a first characteristic direction. A second part of the carbon nanotubes 145 is aligned along a second direction Y or namely a second characteristic direction. An angle a between the first direction X and the second direction Y of the carbon nanotubes 145 can be in a range from about 0 degrees to about 90 degrees. In one embodiment, the first direction X is substantially perpendicular to the second direction Y, as shown in FIG. 2. The first part of the carbon nanotubes 145 crosses with the second part of the carbon nanotubes 145 to form a grid.

When the strain gauge 12 is stretched in a third direction e, or namely a third characteristic direction, which is substantially parallel to the angular bisector of the angle a between the first direction X and the second direction Y, it tends to contract in a fourth direction f substantially perpendicular to the direction of stretching. Conversely, when the strain gauge 12 is compressed in the third direction e, it tends to expand in the fourth direction f substantially perpendicular to the direction of compression. Therefore, the strain gauge 12 has a positive Poisson's ratio when it is stretched or compressed in the third direction e. Referring to FIG. 2, in one embodiment, the third direction e is substantially parallel to the long side of the strain gauge 12 with a rectangular shape. The fourth direction f is substantially parallel to the short side of the strain gauge 12.

Figure 3:
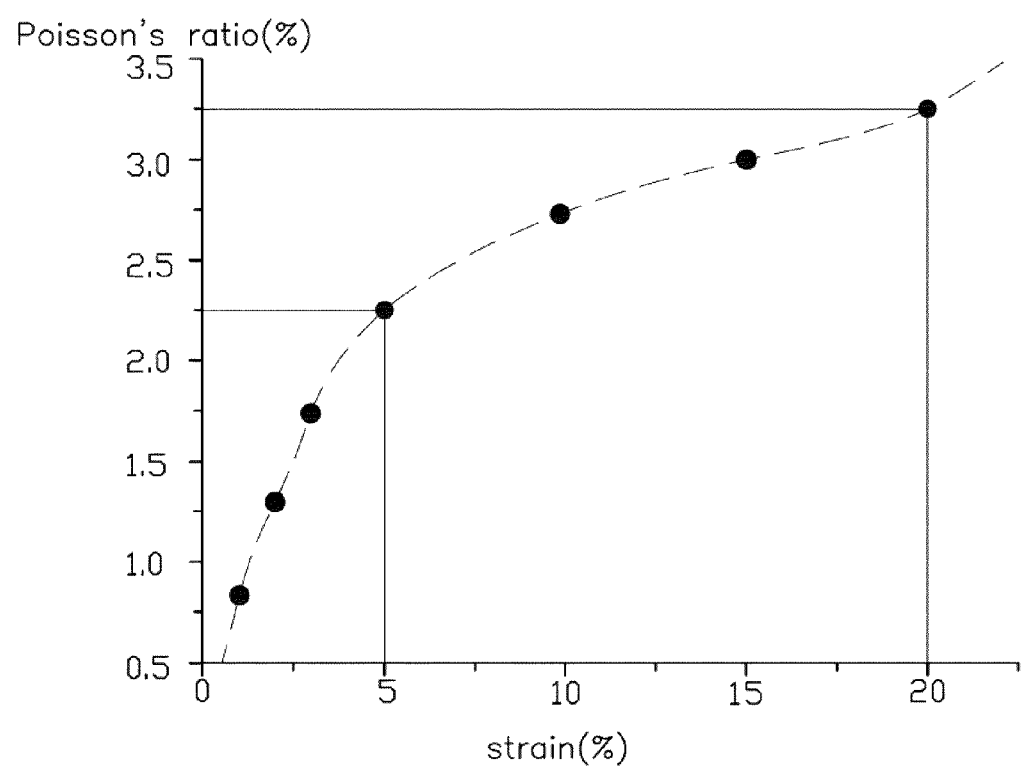
FIG. 3 shows changes of Poisson's ratios of the strain gauge in FIG. 2 with increasing strain.

Referring to FIG. 3, it shows the changes of Poisson's ratios of the strain gauge 12 with increasing strain. When the strain of the Poisson's ratio in the third direction is 5%, the Poisson's ratio is 2.25. When the strain of the Poisson's ratio in the third direction is 20%, the Poisson's ratio is 3.25.

Figure 4:
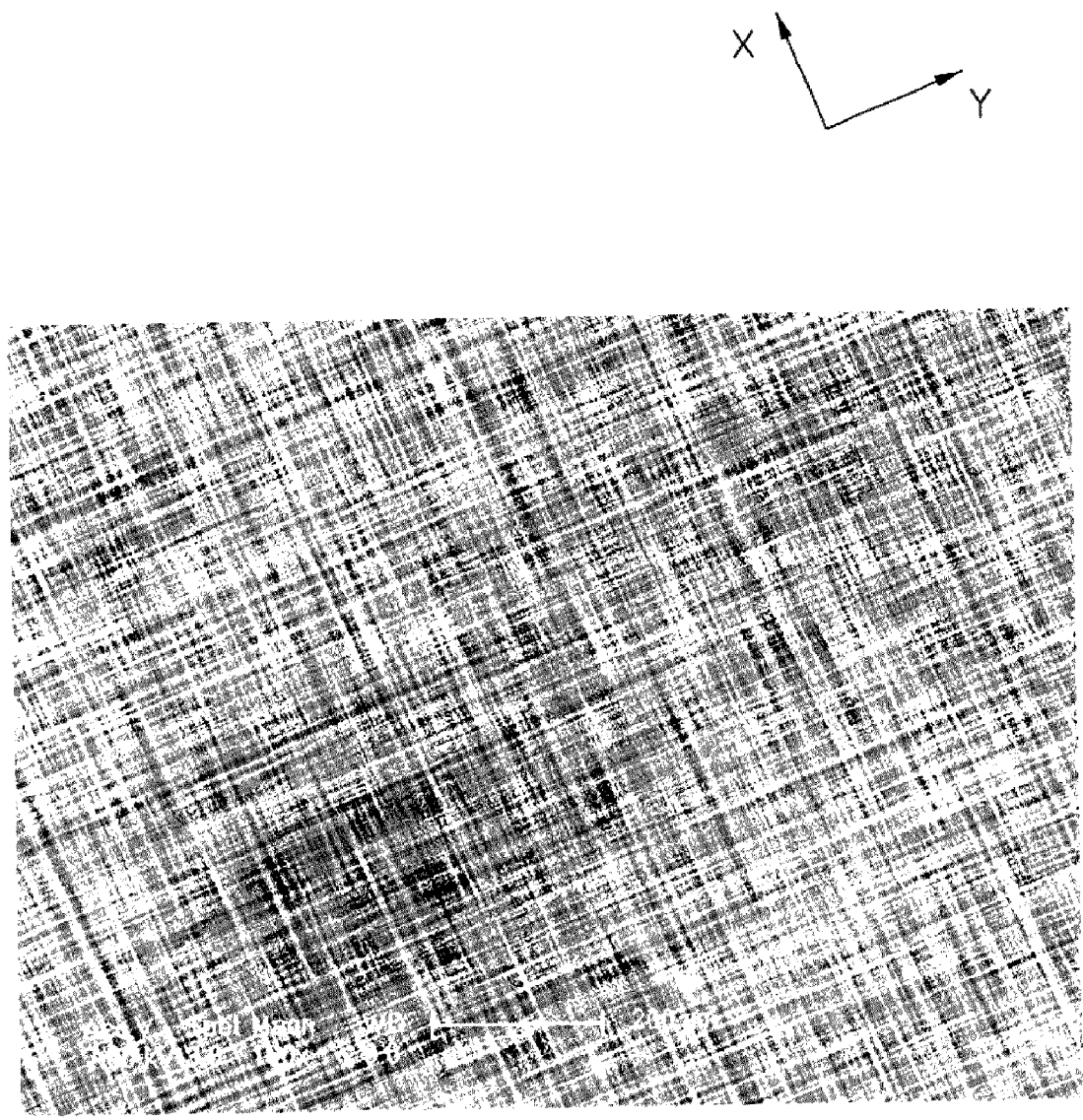
FIG. 4 is a Scanning Electron Microscope (SEM) image of the carbon nanotube film structure used in the strain gauge of FIG. 2.

Referring to FIG. 4, the above-described carbon nanotubes form at least two stacked carbon nanotube films to form the carbon nanotube film structure 146. The carbon nanotube film includes a plurality of successively oriented carbon nanotube segments joined end-to-end by van der Waals attractive force therebetween. Each carbon nanotube segment includes a plurality of carbon nanotubes substantially parallel to each other, and combined by van der Waals attractive force therebetween. Therefore, the carbon nanotubes in each of the carbon nanotube films are successively oriented and are joined end to end by Van der Waals attractive force. The carbon nanotube films of the carbon nanotube film structure 146 can be sorted into two sorts by the orientation of the carbon nanotubes. In one sort, the orientation of the carbon nanotubes is along the first direction X. In another sort, the orientation of the carbon nanotubes is along the second direction Y. A thickness of each of the carbon nanotube films is in a range from about 0.5 nanometers to about 1 micron. In one embodiment, the first direction X is substantially perpendicular to the second direction Y, as shown in FIG. 4.

The orientations of the carbon nanotubes in every two adjacent carbon nanotube films are substantially perpendicular to each other. The carbon nanotube films are integrated with each other by Van der Waals attractive force to form the carbon nanotube film structure. The carbon nanotube film structure 146 is a free-standing structure. Free standing means that the carbon nanotubes combine, connect or join with each other by Van der Waals attractive force, to form the carbon nanotube film structure. The carbon nanotube film structure 146 can be supported by itself and does not need a substrate for support. It should be noted that the carbon nanotube film structure 146 may be positioned on a substrate in actual application if additional strength for a particular application of the carbon nanotube film structure 146. The number of the layers of the carbon nanotube films in the strain gauge 12 is not limited. In one embodiment, the number of the layers of the carbon nanotube films in the strain gauge 12 can be in a range from 10 to 5000. The thickness of the carbon nanotube film structure 146 is in a range from about 0.04 micron to about 400 microns.

Figure 5:
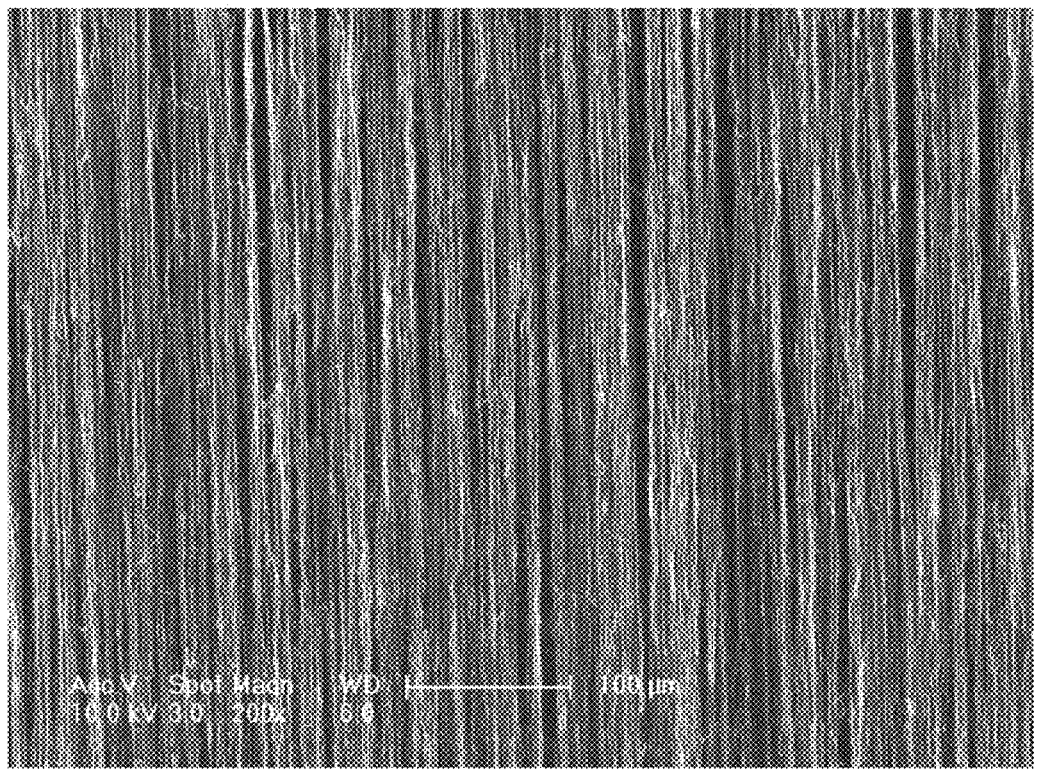
FIG. 5 is an SEM image of a drawn carbon nanotube film of the carbon nanotube film structure of FIG. 4.
Figure 6:
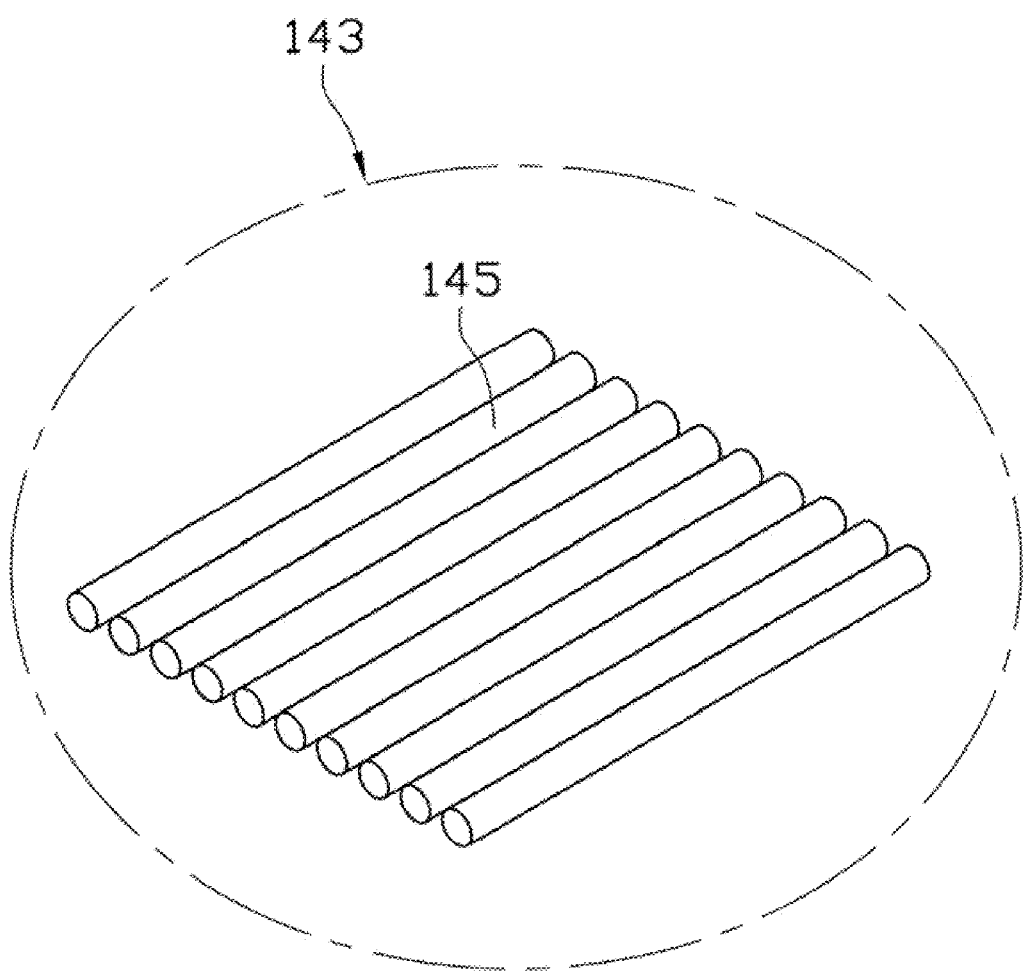
FIG. 6 is a schematic enlarged view of a carbon nanotube segment.

Referring to FIG. 5 and FIG. 6, the carbon nanotube film includes a plurality of successively oriented carbon nanotube segments 143 joined end-to-end by Van der Waals attractive force therebetween. Each carbon nanotube segment 143 includes a plurality of carbon nanotubes 145 substantially parallel to each other, and combined by Van der Waals attractive force therebetween. The carbon nanotube segments 143 can vary in width, thickness, uniformity, and shape. The carbon nanotubes 145 in the carbon nanotube film are also oriented substantially along a preferred orientation.

In one embodiment, the carbon nanotube film structure 146 can be manufactured by the following steps:

(a) providing a super-aligned carbon nanotube array;

(b) selecting one or more carbon nanotubes having a predetermined width from the super-aligned carbon nanotube array;

(c) pulling out the carbon nanotubes from the super-aligned carbon nanotube array to form carbon nanotube segments that are joined end to end at a uniform speed to achieve a uniform carbon nanotube film; and (d) providing a frame and stacking at least two carbon nanotube films on the frame to form the above described carbon nanotube film structure 146.

In step (a), the super-aligned carbon nanotube array can be formed by:

(a1) providing a substantially flat and smooth substrate;

(a2) forming a catalyst layer on the substrate;

(a3) annealing the substrate with the catalyst layer in air at a temperature from about 700° C. to about 900° C. for about 30 to about 90 minutes;

(a4) heating the substrate with the catalyst layer to a temperature from about 500° C. to about 740° C. in a furnace with a protective gas therein; and (a5) supplying a carbon source gas to the furnace for about 5 to about 30 minutes and growing the super-aligned carbon nanotube array on the substrate.

In step (a1), the substrate can be a P-type silicon wafer, an N-type silicon wafer, or a silicon wafer with a film of silicon dioxide thereon. Here, a 4-inch P-type silicon wafer is used as the substrate.

In step (a2), the catalyst can be iron (Fe), cobalt (Co), nickel (Ni), or any alloy thereof.

In step (a4), the protective gas can be at least one of the following: nitrogen (N2), ammonia (NH3), and a noble gas. In step (a5), the carbon source gas can be a hydrocarbon gas, such as ethylene (C2H4), methane (CH4), acetylene (C2H2), ethane (C2H6), or any combination thereof.

The super-aligned carbon nanotube array can be about 200 microns to about 400 microns in height, and includes a plurality of substantially parallel carbon nanotubes approximately perpendicular to the substrate. The carbon nanotubes in the super-aligned carbon nanotube array can be single-walled carbon nanotubes, double-walled carbon nanotubes, or multi-walled carbon nanotubes. Diameters of the single-walled carbon nanotubes can be from about 0.5 nanometers to about 10 nanometers, diameters of the double-walled carbon nanotubes can be from about 1 nanometer to about 50 nanometers, and diameters of the multi-walled carbon nanotubes can be from 1.5 nanometers to 50 nanometers.

The super-aligned carbon nanotube array formed under such conditions is essentially free of impurities such as carbonaceous or residual catalyst particles. The carbon nanotubes in the super-aligned array are closely packed together by Van der Waals attractive force.

In step (b), the carbon nanotubes having a predetermined width can be selected by using an adhesive tape as the tool to contact the super-aligned carbon nanotube array. Each carbon nanotube segment includes a plurality of substantially parallel carbon nanotubes. In step (c), the pulling direction is substantially perpendicular to the growing direction of the super-aligned carbon nanotube array.

Specifically, during the pulling process, as the initial carbon nanotube segment is drawn out, other carbon nanotube segments are also drawn out end-to-end due to the Van der Waals attractive force between ends of adjacent segments. This process of drawing ensures that a continuous, uniform carbon nanotube film having a certain width can be formed. The carbon nanotube film includes a plurality of carbon nanotubes joined end-to-end. The carbon nanotubes in the carbon nanotube film are all substantially parallel to the pulling/drawing direction, and the carbon nanotube film produced in such manner can be selectively formed to have a predetermined width. The carbon nanotube film formed by the pulling/drawing method has superior uniformity of thickness and conductivity over a typical carbon nanotube film in which the carbon nanotubes are disorganized and not arranged along any particular axis. Furthermore, the pulling/drawing method is simple and quick, thereby making it suitable for industrial applications.

The maximum width possible for the carbon nanotube film depends on the size of the carbon nanotube array. The length of the carbon nanotube film can be arbitrarily set as desired. If the substrate is a 4-inch P-type silicon wafer, the width of the carbon nanotube film can be from about 0.01 centimeters to about 10 centimeters, and the thickness of the carbon nanotube film is from about 0.5 nanometers to about 100 microns.

In step (d), it is noted that because the carbon nanotubes in the super-aligned carbon nanotube array have a high purity and a high specific surface area, the carbon nanotube film is adherent in nature. As a result, at least one carbon nanotube film can be directly adhered to the frame, thus forming one carbon nanotube film structure 146 on the frame, thereby creating one carbon nanotube film structure 146.

For example, two or more such carbon nanotube films can be stacked on each other on the frame to form a carbon nanotube film structure 146 with stacked carbon nanotube films. The angle between the alignment axes of the carbon nanotubes in each two adjacent carbon nanotube films can be in a range from 0 degree to about 90 degrees. In one embodiment, the angle between the alignment axes of the carbon nanotubes in each two adjacent carbon nanotube films is about 90 degrees. The carbon nanotubes in each two adjacent carbon nanotube films are crossing each other, thereby providing the carbon nanotube film structure 146 with a microporous structure.

It is to be understood that in alternative embodiments, the carbon nanotube film structure 146 can be treated with an organic solvent. In these situations, each carbon nanotube film or the carbon nanotube film structure 146 can be adhered on the frame and soaked in an organic solvent bath. After being soaked in the organic solvent, the carbon nanotube segments in the nanotube film of the carbon nanotube film structure 146 can, at least partially, shrink and firmly bundle into carbon nanotube bundles.

Figure 7:
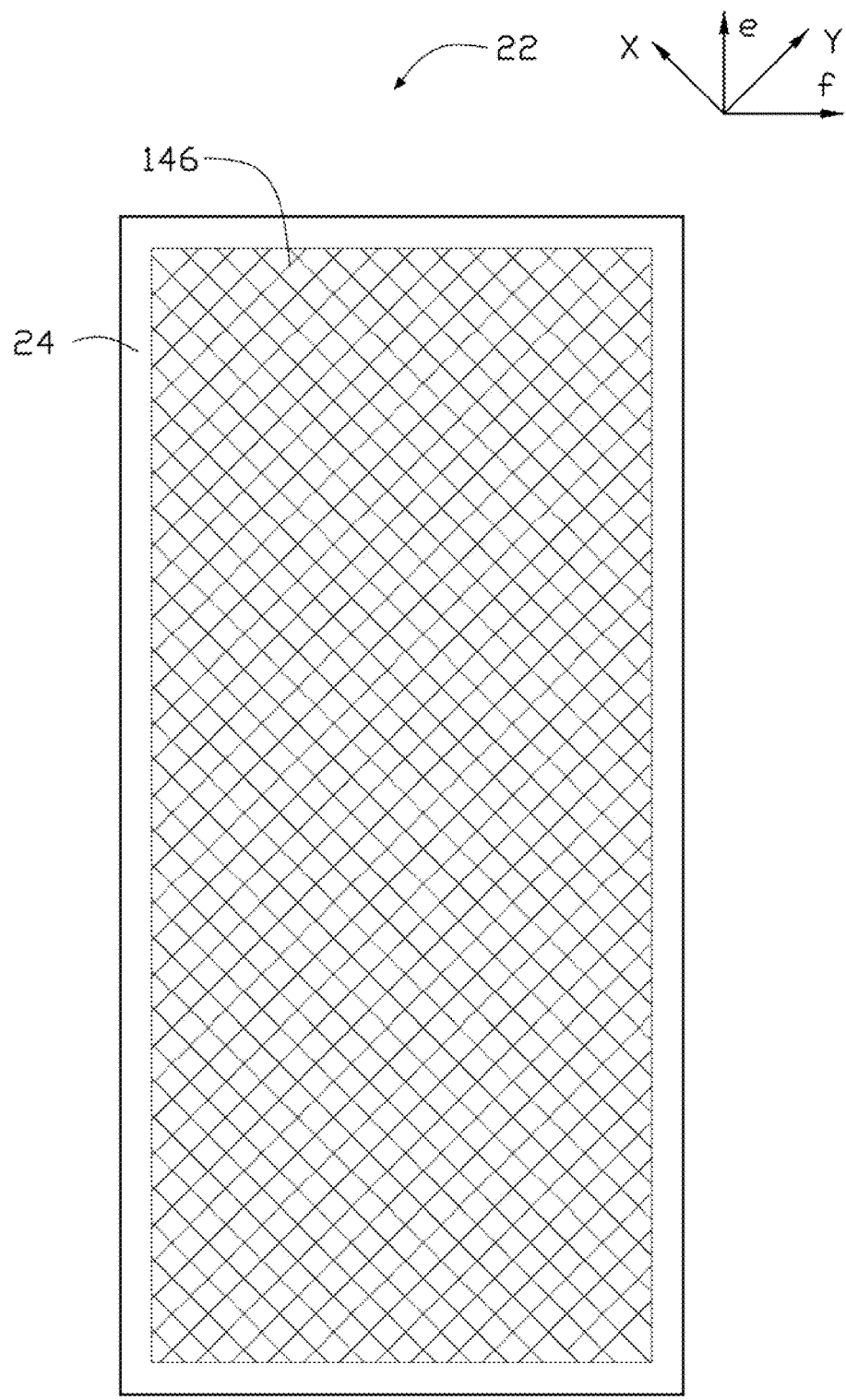
FIG. 7 is a top schematic view of one embodiment of the strain gauge of the strain measurement device.

Referring to FIG. 7, another embodiment of a strain gauge 22 includes a carbon nanotube film structure 146 and a polymer matrix 24, which may be made of a flexible polymer material. The carbon nanotube film structure 146 is disposed in the flexible polymer matrix 24.

The flexible polymer of the polymer matrix 24 can be polydimethylsiloxane (PDMS), polyurethane, epoxy resin, or polymethyl-methacrylate (PMMA). In one embodiment, the flexible polymer is polydimethylsiloxane (PDMS), which is transparent and flexible and has a very large strain-to-failure (>150%). Thus, the Poisson's ratio strain gauge 22 has a large strain-to-failure rate of about 22%. In one embodiment, the flexible polymer matrix is a flexible polymer layer with a thickness in a range from about 100 μm to about 1000 μm.

In one embodiment, the carbon nanotube film structure 146 is locally distributed in the flexible polymer matrix 24 due to its limited thickness (about 40 microns) compared to the thickness of the flexible polymer matrix 24 (about 200 microns), which causes a sandwich layer structure in the composite. In the CNT/PDMS composite region, the carbon nanotubes are evenly dispersed in the PDMS matrix.

Figure 8:
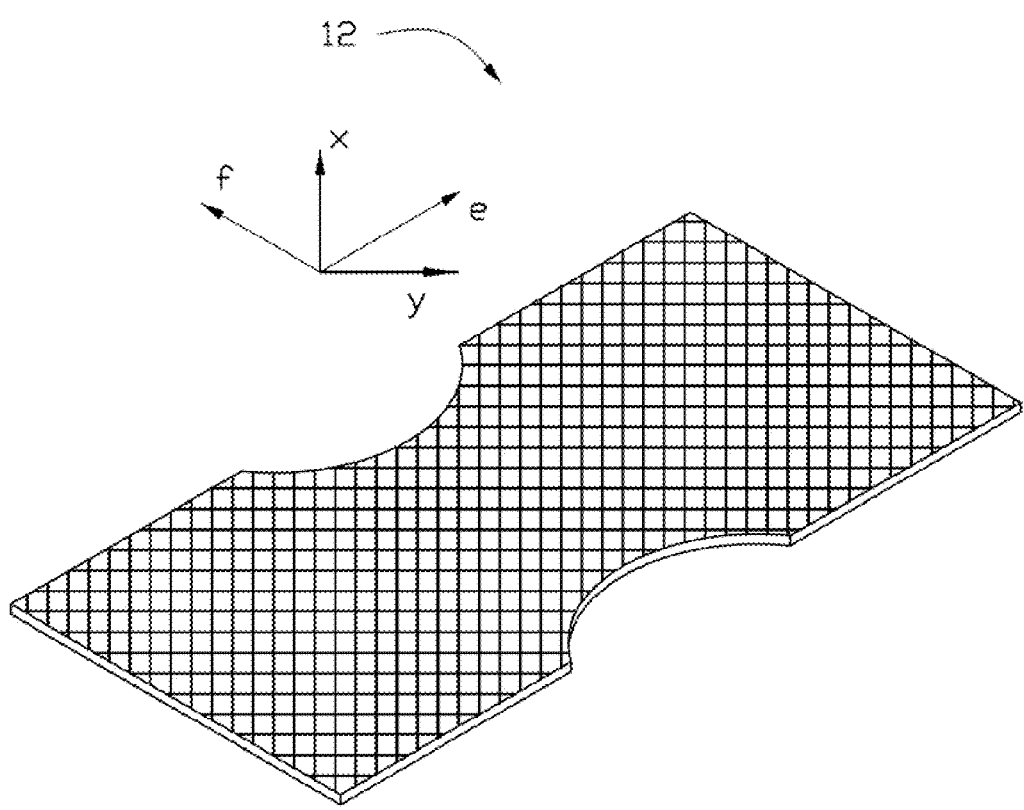
FIG. 8 is a top schematic view of another embodiment of the strain gauge of the strain measurement device.

It is noteworthy that, although the strain gauges shown in FIGS. 2, and 7 have a rectangular shape, the strain gauges can be cut into other shapes, such as round, ellipse, or triangular, to adapt the actual needs of the specimen 16. Referring to FIG. 8, in one embodiment, the strain gauge 12 is a dumb-bell like shape.

In one embodiment, a method for measuring an axial strain of a specimen 16 using the strain measurement device 100 is provided. Referring to FIG. 1, the method includes the following steps:

(S1) providing a strain measurement device 100;

(S2) determining a relation between an axial strain $\epsilon_i$ and a transverse strain $\epsilon_j$ of the strain gauge 12, in a formula $\epsilon_i = f(\epsilon_j)$;

(S3) providing a specimen 16, and bonding the strain gauge 12 on a surface of the specimen 16;

(S4) fastening the specimen 16 bonded the strain gauge 12 between the first clip 104 and the second clip 106 along the third direction e of the strain gauge 12;

(S5) applying a force along the third direction e of the strain gauge 12 to the specimen 16;

(S6) recording a transverse strain $\epsilon_j$ of the strain gauge 12 via the transverse strain recorder 102, and calculating the axial strain $\epsilon_i$ via the formula of $\epsilon_i = f(\epsilon_j)$.

Referring to FIG. 2, the third direction e of the strain gauge 12 is defined as an axial direction of the axial strain $\epsilon_i$. The fourth direction f of the strain gauge 12 is defined as a transverse direction of the transverse strain $\epsilon_j$. In step (S2), the formula $\epsilon_i = (\epsilon_j)$ is concluded by the following steps:

(S21) stretching the strain gauge 12 along the third direction many times with different forces, and recording the axial strains $\epsilon_i$ and the transverse strains $\epsilon_j$ according to different forces;

(S22) getting the relation $\epsilon_i = f(\epsilon_j)$ between the axial strain $\epsilon_i$ and the transverse strain $\epsilon_j$ of the strain gauge 12, by quadratic polynomial fitting.

Figure 9:
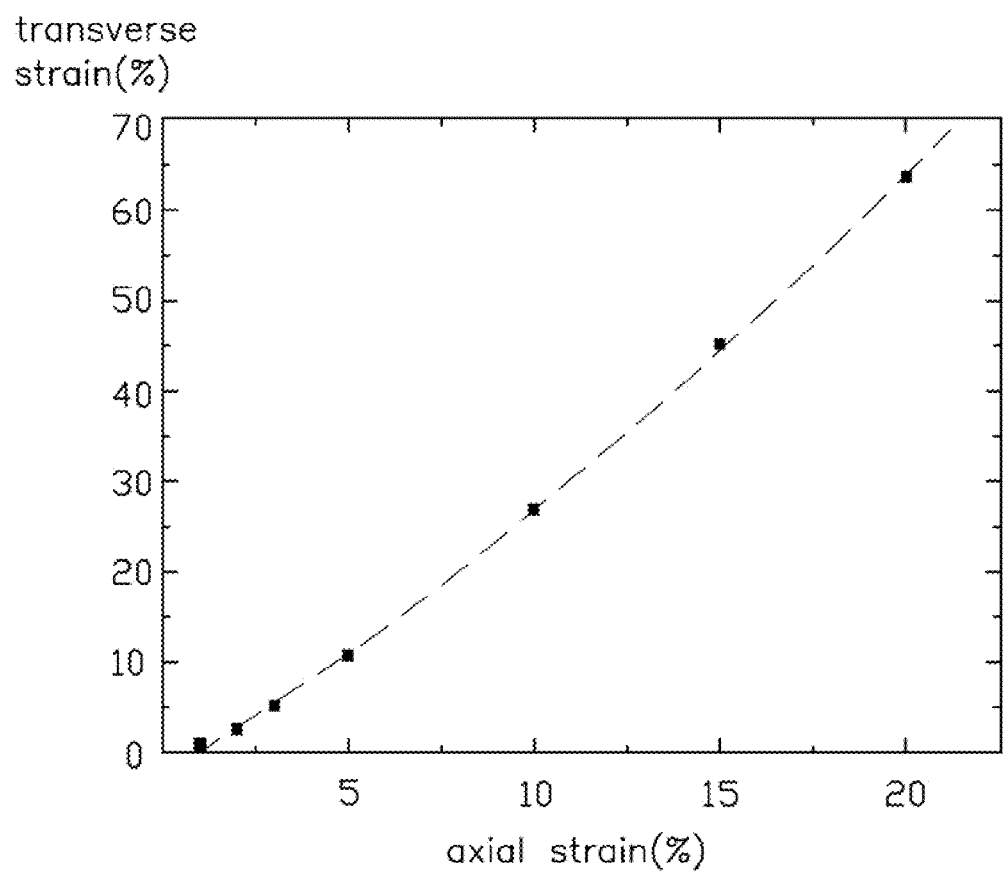
FIG. 9 shows a relation between a transverse strain and an axial strain of the strain gauge in one embodiment.

Referring to FIG. 9, in one embodiment, the strain gauge 12 includes 100 layers of carbon nanotube films. The relation between the axial strain $\epsilon_i$ and the transverse strain $\epsilon_j$ of the strain gauge 12 is $\epsilon_i = -2.45234 + 2.55284\epsilon_j + 0.03821\epsilon_j^2$, according to the quadratic polynomial fitting.

In step (S3), the specimen 16 has a same shape as that of the strain gauge 12. In one embodiment, the specimen 16 is a rectangular sheet material. Glue is coated on the surface at the two ends of the specimen 16 at the short sides, and then the strain gauge 12 is bonded on the surface of the specimen 16. The long sides of the specimen 16 are substantially parallel to the third direction e of the strain gauge 12. The short sides of the specimen 16 are substantially parallel to the fourth direction f of the strain gauge 12.

In step (S4), the short sides of the specimen 16 are separately clipped to the first clip 104 and the second clip 106. The long sides of the specimen 16 are substantially parallel to the third direction e of the strain gauge 12, thus the specimen 16 can be stretched along the third direction e via moving the first clip 104 and the second clip 106. Therefore, in step (S5), when a force is applied along the third direction e to the specimen 16, the specimen 16 and the strain gauge 12 have a same axial strain $\epsilon_i$.

In step (S6), in one embodiment, the transverse strain recorder 102 is a digital camera, and can record the transverse strain $\epsilon_j$. The data processing device 101 can calculate the axial strain $\epsilon_i$ corresponding to the transverse strain $\epsilon_j$ via $\epsilon_i=f(\epsilon_j)$. In one embodiment, the data processing device 101 is a small computer. The relation between an axial strain $\epsilon_i$ and a transverse strain $\epsilon_j$ of the strain gauge 12 is $\epsilon_i=-2.45234+2.55284\epsilon_j+0.03821\epsilon_j^2$. The axial strain $\epsilon_i$ is calculated by the small computer based on the formula $\epsilon_i=-2.45234+2.55284\epsilon_j+0.03821\epsilon_j^2$.

Depending on the embodiment, certain of the steps described below may be removed, others may be added, and the sequence of steps may be altered. It is also to be understood that the above description and the claims drawn to a method may include some indication in reference to certain steps. However, the indication used is only to be viewed for identification purposes and not as a suggestion as to an order for the steps.

It is to be understood that the above-described embodiments are intended to illustrate rather than limit the present disclosure. Any elements described in accordance with any embodiments is understood that they can be used in addition or substituted in other embodiments. Embodiments can also be used together. Variations may be made to the embodiments without departing from the spirit of the present disclosure. The above-described embodiments illustrate the scope of the invention but do not restrict the scope of the present disclosure.

What is claimed is:

1. A strain measurement device, comprising:
a strain gauge, and at least one first and at least one second layer of carbon nanotube films, each carbon nanotube film having a plurality of carbon nanotubes, the plurality of carbon nanotubes in the first layer of carbon nanotube film aligned along a first direction, and the plurality of carbon nanotubes in the second layer of carbon nanotube film aligned along a second direction, an angle between the first direction and the second direction is in a range from about 0 degrees to about 90 degrees, wherein a third direction is substantially parallel to a bisector of the angle, and a fourth direction is substantially perpendicular to the third direction;
a holding device, wherein the strain gauge is secured to the holding device;
a transverse strain recorder capable of recording a transverse strain in the fourth direction; and
a data processing device capable of calculating an axial strain in the third direction of the strain gauge.

2. The strain measurement device of claim 1, wherein the strain gauge is a sheet material, a longitudinal axis of the strain gauge is substantially parallel to the third direction, and a short side of the strain gauge is substantially parallel to the fourth direction.

3. The strain measurement device of claim 1, wherein the at least one first and at least one second layers of carbon nanotube films are stacked and joined to each other by Van der Waals attractive force, to form a carbon nanotube film structure.

4. The strain measurement device of claim 1, wherein each carbon nanotube film comprises a plurality of successively oriented carbon nanotube segments joined end-to-end by Van der Waals attractive force therebetween.

5. The strain measurement device of claim 4, wherein each carbon nanotube segment includes a plurality of carbon nanotubes substantially parallel to each other, and combined by Van der Waals attractive force therebetween.

6. The strain measurement device of claim 1, wherein the strain gauge is capable of having the same axial strain as a specimen during operation.

7. The strain measurement device of claim 1, wherein the holding device comprises a first clip and a second clip, and the first clip and the second clip are relatively moveable.

8. The strain measurement device of claim 1, wherein the transverse strain recorder is an image recording device.

9. The strain measurement device of claim 1, wherein the data processing device is a computing device.

10. A strain measurement device, comprising:
a strain gauge comprising a polymer matrix, and a carbon nanotube film structure disposed in the polymer matrix, the carbon nanotube film structure comprising a plurality of carbon nanotubes, wherein a first part of the carbon nanotubes is aligned along a first direction, a second part of the carbon nanotubes is aligned along a second direction, and an angle between the first direction and the second direction is in a range from about 0 degrees to about 90 degrees, wherein when the strain gauge is stretched or compressed in a third direction that is substantially parallel to a bisector of the angle between the first direction and the second direction, the strain gauge contracts or expands in a fourth direction substantially perpendicular to the third direction; and
a holding device, wherein the strain gauge is capable of being fastened on the holding device;
a transverse strain recorder capable of recording a transverse strain in the fourth direction of the strain gauge; and
a data processing device capable of calculating a axial strain in the third direction of the strain gauge.

11. The strain measurement device of claim 10, wherein the strain gauge is a sheet material, a longitudinal axis of the strain gauge is substantially parallel to the third direction, and a short side of the strain gauge is substantially parallel to the fourth direction.

12. The strain measurement device of claim 10, wherein the strain gauge has a same axial strain as a specimen during operation.

13. The strain measurement device of 10, wherein the polymer matrix is a flexible polymer layer having a thickness in a range from about 100 µm to about 1000 µm.

14. The strain measurement device of claim 10, wherein the polymer matrix is polydimethylsiloxane.

15. A method of strain measurement comprising:
providing a strain measurement device, the strain measurement device comprising:
a strain gauge, and at least one first and at least one second layer of carbon nanotube film, each layer of carbon nanotube film having a plurality of carbon nanotubes, the plurality of carbon nanotubes of the first layer of carbon nanotube film aligned along a first direction, and the plurality of carbon nanotubes of second layer of carbon nanotube film aligned along a second direction, an angle between the first direction and the second direction being in a range from about 0 degrees to about 90 degrees, wherein when the strain gauge is stretched or compressed in a third direction substantially parallel to a bisector of the angle between the first direction and the second direction, and the strain gauge contracts or expands in the fourth direction substantially perpendicular to the third direction;

a holding device comprising a first clip and a second clip, wherein the strain gauge is capable of being fastened between the first clip and the second clip;

a transverse strain recorder capable of recording a transverse strain of the strain gauge, wherein the transverse strain is in the fourth direction; and a data processing device capable of calculating an axial strain of the strain gauge, wherein the axial strain is in the third direction;

determining a relation between the axial strain $\epsilon_i$ and the transverse strain $\epsilon_j$ of the strain gauge 12, in a formula $\epsilon_i = f(\epsilon_j)$;

bonding the strain gauge on a surface of a specimen, wherein the specimen and the strain gauge are fastened between the first clip and the second clip along the third direction of the strain gauge, and the specimen has a same shape as the strain gauge;

fastening the specimen bonded to the strain gauge between the first clip and the second clip along the third direction of the strain gauge;

applying a force along the third direction of the strain gauge to the specimen; and recording the transverse strain $\epsilon_j$ of the strain gauge via the transverse strain recorder, and calculating the axial strain $\epsilon_i$ via the data processing device based on the formula of $\epsilon_i = f(\epsilon_j)$.

16. The method of strain measurement of claim 15, wherein the strain gauge and the specimen have a same axial strain $\epsilon_i$.

17. The method of strain measurement of claim 15, wherein the formula $\epsilon_i = f(\epsilon_j)$ is determined by the following steps:

stretching the strain gauge along the third direction multiple times with different forces, and recording the axial strain $\epsilon_i$ and the transverse strain $\epsilon_j$ of the strain gauge;

getting the relation $\epsilon_i = f(\epsilon_j)$ between the axial strain $\epsilon_i$ and the transverse strain $\epsilon_j$ of the strain gauge, by quadratic polynomial fitting.

18. The method of strain measurement of claim 17, wherein the strain gauge comprises 100 layers of carbon nanotube film, the relation between the axial strain $\epsilon_i$ and the transverse strain $\epsilon_j$ of the strain gauge is $\epsilon_i = -2.45234 + 2.55284\epsilon_j + 0.03821\epsilon_j^2$.

19. The method of strain measurement claim 15, wherein the strain gauge is a sheet material, a longitudinal axis of the strain gauge is substantially parallel to the third direction, and short sides of the strain gauge are substantially parallel to the fourth direction.

20. The method of strain measurement of claim 19, wherein the strain gauge is bonded on the surface of the specimen at the short sides.

* * * * *